(12) United States Patent  
Susami (10) Patent No.: US 9,395,235 B2  
(45) Date of Patent: Jul. 19, 2016

(54) STRIKING DETECTION DEVICE AND METHOD

(71) Applicant: Roland Corporation, Hamamatsu, Shizuoka-ken (JP)

(72) Inventor: Ryo Susami, Hamamatsu (JP)

(73) Assignee: Roland Corporation, Hamamatsu (JP)

( * ) Notice: Subject to any disclaimer, the term of this patent is extended or adjusted under 35 U.S.C. 154(b) by 796 days.

(21) Appl. No.: 13/706,204

(22) Filed: Dec. 5, 2012

(65) Prior Publication Data

US 2013/0180335 A1  Jul. 18, 2013

(30) Foreign Application Priority Data

Jan. 12, 2012  (JP) .................... 2012-004145

(51) Int. Cl.
| | |
|---|---|
| G01H 1/00 | (2006.01) |
| G01H 1/12 | (2006.01) |
| G01H 1/16 | (2006.01) |
| G01L 5/00 | (2006.01) |
| G10H 1/053 | (2006.01) |
| G10H 3/14 | (2006.01) |

(52) U.S. Cl.
CPC . *G01H 1/12* (2013.01); *G01H 1/16* (2013.01); *G01L 5/0052* (2013.01); *G10H 1/053* (2013.01); *G10H 3/146* (2013.01); *G10H 2230/275* (2013.01)

(58) Field of Classification Search
CPC .......... G01H 1/12; G01H 1/16; G10H 1/053; G10H 3/146; G10H 2230/275; G01L 5/0052
See application file for complete search history.

(56) References Cited

U.S. PATENT DOCUMENTS

| | | | | | |
|---|---|---|---|---|---|
| 3,502,983 | A | * | 3/1970 | McLaughlin | ............. H04B 3/46 178/69 A |
| 3,759,085 | A | * | 9/1973 | Wilson | ................... G01L 5/0052 73/12.09 |
| 4,534,206 | A | * | 8/1985 | Kiso | ........................ G01M 7/08 73/12.09 |
| 4,962,660 | A | * | 10/1990 | Dailey | ..................... G01N 3/30 73/12.09 |
| 5,048,320 | A | * | 9/1991 | Mitsuhashi | ............. G01M 7/08 73/12.09 |
| 7,682,237 | B2 | * | 3/2010 | Ueshima | ................. A63F 13/08 463/35 |
| 9,240,173 | B2 | * | 1/2016 | Takasaki | ................ G10H 3/146 |
| 2005/0096132 | A1 | * | 5/2005 | Ueshima | ................. A63F 13/08 463/37 |
| 2006/0101897 | A1 | * | 5/2006 | Masuya | ................. B23Q 17/12 73/12.01 |

FOREIGN PATENT DOCUMENTS

| | | | |
|---|---|---|---|
| JP | S62-156698 A | 7/1987 | |
| JP | 2000-020064 A | 1/2000 | |
| JP | EP 1657022 A1 * | 5/2006 | ............. B23Q 17/12 |

OTHER PUBLICATIONS

Naota (English Translation of Japanese Patent Application Publication JP 2000 020064 A).*
Japanese Notification of Reasons for Refusal dated Aug. 13, 2015 with English translation.
Written Amendment dated Sep. 28, 2015, from related Japanese application No. 2012-004145 (with English translation).
Written Argument dated Sep. 28, 2015, from related Japanese application No. 2012-004145 (with English translation).

* cited by examiner

*Primary Examiner* — Harshad R Patel
*Assistant Examiner* — Samir M Shah
(74) *Attorney, Agent, or Firm* — Foley & Lardner LLP (57) ABSTRACT

Based on a peak level of a waveform in a predetermined period after the input of the waveform started and a value indicative of the degree of change in the waveform in the predetermined period, a judging device determines whether the waveform is caused by a strike. Thus, the peak level and a value indicative of the degree of change in the waveform are considered to determine whether the waveform is caused by a strike. A waveform with a small peak level caused by a weak strike is not erroneously detected as noise, while accurate detection of strikes can be obtained.

21 Claims, 5 Drawing Sheets

FIG. 1

FIG. 2  Waveform caused by a strike (a)

Waveform caused by noise (stick count noise)

STRIKING DETECTION DEVICE AND METHOD

CROSS-REFERENCE TO RELATED PATENT APPLICATIONS

Japan Priority Application No. 2012-004145, filed on Jan. 12, 2012, including the specification, drawings, claims and abstract, is incorporated herein by reference in its entirety.

FIELD OF THE INVENTION

Embodiments of the present invention relate to striking detection devices and methods of making and using the same, and, in particular embodiments, to striking detection devices that accurately detect strikes on a striking surface.

BACKGROUND

A typical electronic percussion instrument is provided with a sensor that detects the vibration of a striking surface caused by striking the striking surface. Conventionally, to prevent erroneous tone generation due to noise, or the like, a threshold is provided. The threshold and an output value from the sensor are compared, and the tone generation is controlled. (See, for example, Japanese Laid-open Patent Application HEI 10-20854.) More specifically, when the output value from the sensor exceeds the threshold, it is determined that the sensor has detected the vibration of the striking surface caused by striking, and a tone is generated. On the other hand, when the output value from the sensor is below the threshold, it is determined that the vibration detected by the sensor is caused by noise or the like, and a tone is not generated.

When tone generation is controlled based on comparison of the output value from the sensor with a threshold, it is possible to prevent erroneous detection that may be caused by noise. However, weak striking during performance might not be detected and, occasionally, sounds that are supposed to be pronounced might not be generated.

SUMMARY OF THE DISCLOSURE

In contrast, embodiments of the present invention relate to a striking detection device that accurately detects striking on a striking surface.

In a striking detection device according to an embodiment of the present invention, based on a peak level (a peak level of a waveform in a predetermined period after input of the waveform has started) acquired by the peak level acquisition device and a value (a value indicative of the degree of change in the waveform in the predetermined period) acquired by the value acquisition device, a judging device determines whether or not the waveform is one that is caused by striking on the striking surface. Therefore, for example, a waveform with a small peak level caused by a weak strike can be prevented from being erroneously detected as a noise, while accurate detection of strikes on the striking surface can be obtained.

In a further example of a striking detection device according to the above-described embodiment, when the peak level and the value indicative of the degree of change in the waveform satisfy a predetermined relation, the judging device determines that the waveform is one that is caused by a strike on the striking surface. Therefore, for example, a waveform with a small peak level caused by a weak strike can be prevented from being erroneously detected as a noise. In other words, a waveform with a small peak level caused by a weak strike can be detected as being generated by a strike on the striking surface, but not as noise. Therefore, the accuracy in detecting a strike on the striking surface can be improved, because the detection sensitivity to weak striking can be improved.

In a further example of a striking detection device according to any of the embodiments described above, when the value indicative of the degree of change in the waveform indicates that the waveform is vibrating with a frequency below a predetermined threshold, the judging device determines that the waveform is one that is caused by a strike on the striking surface. On the other hand, when the value indicative of the degree of change in the waveform indicates that the waveform is vibrating with a frequency exceeding the predetermined threshold, the judging device determines that the waveform is not one that is caused by a strike on the striking surface. Accordingly, based on the value indicative of the degree of change in a waveform, it is possible to distinguish as to whether or not the waveform is one that is generated by a strike on the striking surface.

In a further example of a striking detection device according to any of the embodiments described above, when the peak level exceeds a first level, the judging device determines that the waveform is one that is caused by a strike on the striking surface, irrespective of the value indicative of the degree of change in the waveform, such that the strike can be readily detected.

In a further example of a striking detection device according to any of the embodiments described above, when the peak level is below a second level, the judging device determines that the waveform is not one that is caused by a strike on the striking surface, irrespective of the value indicative of the degree of change in the waveform, such that noise can be readily detected.

In a further example of a striking detection device according to embodiments described above, the frequency of zero-crossings of the waveform within a predetermined period is obtained by the value acquisition device as a value indicative of the degree of change in the waveform. Therefore the value indicative of the degree of change in a waveform can be readily acquired.

In a further example of a striking detection device according to embodiments described above, a first value divided by a second value within a predetermined period is obtained by the value acquisition device as a value indicative of the degree of change in the waveform, where the first value is a value obtained by adding up absolute values of differences measured at each sampling of the waveform, and where the second value is a value based on the peak value in levels in the added-up segments. Therefore, the value indicative of the degree of change in a waveform can be readily acquired.

In a further example of a striking detection device according to embodiments described above, the frequency of inversions of increases and decreases in the level of the waveform with a hysteresis is obtained by the value acquisition device as a value indicative of the degree of change in the waveform. Therefore, the value indicative of the degree of change in a waveform can be readily acquired.

In a further example of a striking detection device according to the above-described embodiment, a value indicative of the degree of change in a waveform is acquired, in a predetermined period after input of the waveform has begun, by the value acquisition device. When the value acquired by the value acquisition device indicates that the waveform is vibrating with a frequency below a predetermined threshold, it is determined that the waveform is one that is caused by a strike on a striking surface. On the other hand, when the value indicative of the degree of change in the waveform indicates that the waveform is vibrating with a frequency exceeding the predetermined threshold, it is determined that the waveform is one that is not caused by a strike on the striking surface. Therefore, based on the value indicative of the degree of change in a waveform, it is possible to distinguish as to whether the waveform is one that is caused by a strike on the striking surface. Therefore, for example, a waveform with a small peak level caused by a weak strike can be prevented from being erroneously detected as a noise, while accurate detection of strikes on the striking surface can be obtained.

DETAILED DESCRIPTION

Figure 1:
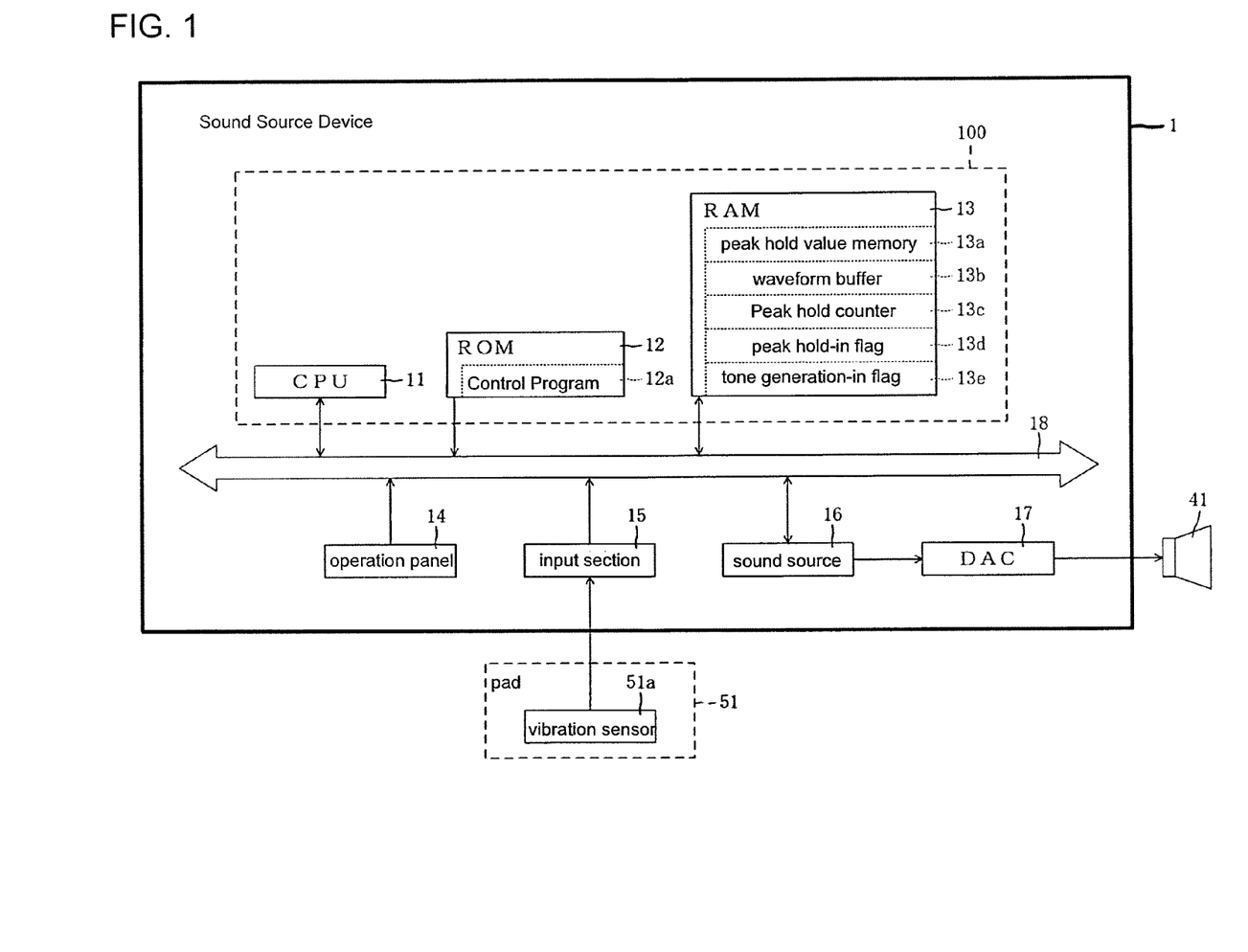
FIG. 1 is a block diagram of an electrical composition of a sound source device.

A preferred embodiment of the invention will be described with reference to the accompanying drawings. FIG. 1 is a block diagram of the electrical composition of a sound source device 1 with a striking detection device 100 in accordance with an embodiment of the present invention. The sound source device 1 generates a musical tone (tone) based on a strike on a pad 51 connected therewith, and outputs the generated tone to a speaker 41 connected therewith.

A voltage waveform output from a vibration sensor 51a that is installed in the pad 51, is input to the sound source device 1 through an input section 15. The sound source device 1 is configured to determine whether or not the input waveform is one that is caused by a strike on the pad 51, where the determination is made based on the frequency of zero-crossings of the voltage waveform input through the input section 15 (hereafter referred to as the "input waveform") and the value at the peak level of the voltage waveform, as described below. Therefore, input waveforms with small peak levels caused by weak strikes are prevented from being erroneously detected as noise, while the detection sensitivity to weak strikes is improved.

The sound source device 1 includes a CPU 11, a ROM 12, a RAM 13, an operation panel 14, an input section 15, a sound source 16, and a digital analog converter (DAC) 17. In one embodiment of the invention, the striking detection device 100 includes the CPU 11, the ROM 12, and the RAM 13. The parts 11-17 are mutually electrically connected through a bus line 18. The vibration sensor 51a of the pad 51 is electrically connected with the input section 15.

The CPU 11 is a central processing unit that controls each of the parts of the sound source device 1 according to fixed values and a program stored in the ROM 12 and data stored in the RAM 13. A timer (not shown), that counts clock signals to measure time, is connected to or built into the CPU 11.

Figure 4:
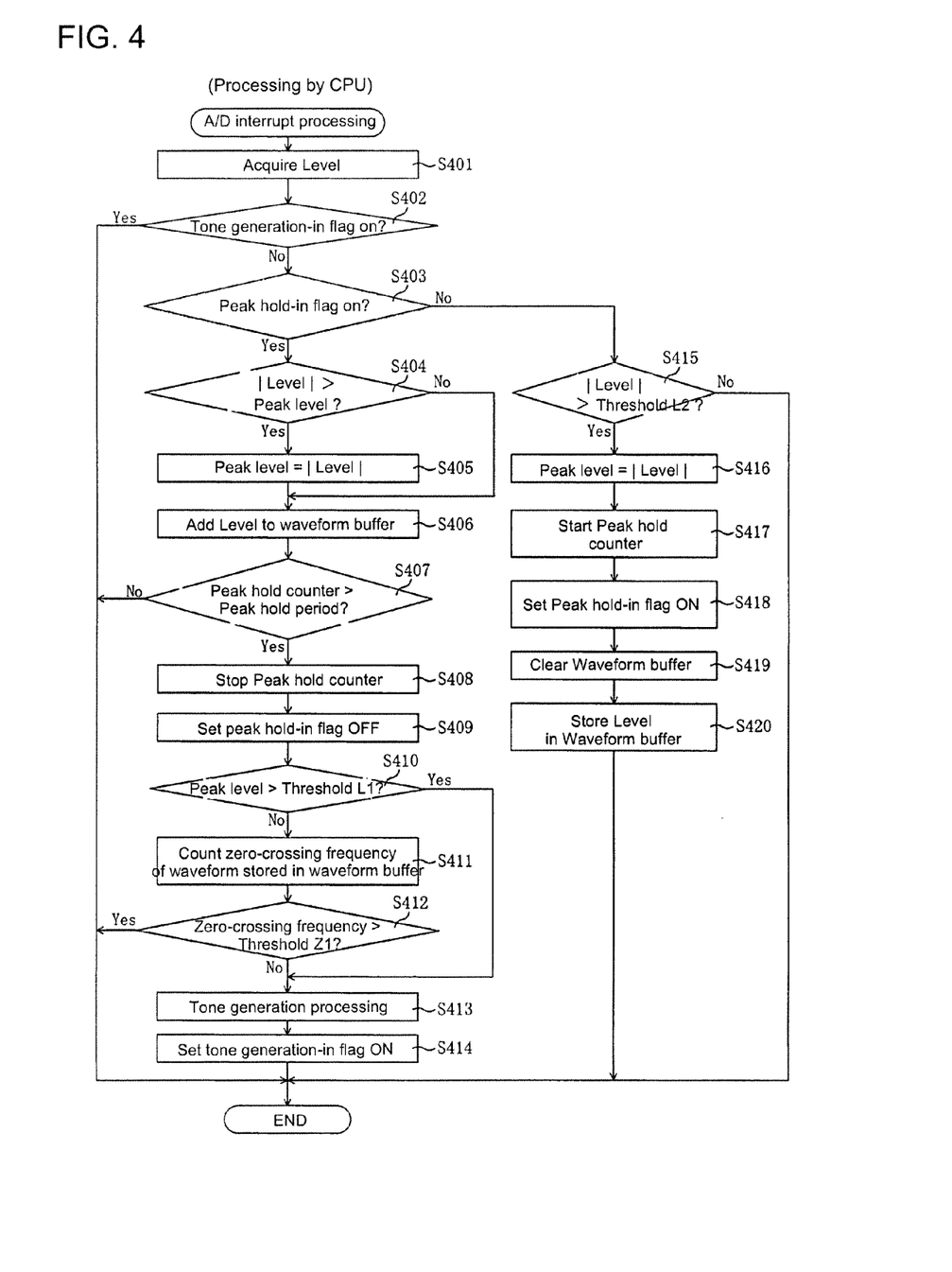
FIG. 4 is a flow chart showing an A/D interrupt processing executed by a CPU.

The ROM 12 is a non-rewritable nonvolatile memory. The ROM 12 stores a control program 12a to be executed by the CPU 11 and the sound source 16, and fixed value data (not shown) to be referred to by the CPU 11 when the control program 12a is executed. Each procedure shown in the flow chart of FIG. 4 is executed based on the control program 12a.

The RAM 13 is a rewritable volatile memory. The RAM 13 has a temporary area to store various data temporarily, when the CPU 11 executes the control program 12a. A peak hold value memory 13a, a waveform buffer 13b, a peak hold counter 13c, a peak hold-in flag 13d and a tone generation-in flag 13e are provided in the temporary area of the RAM 13. Each of the portions 13a-13e provided in the RAM 13 is initialized, when the power supply to the sound source device 1 is turned on.

The peak hold value memory 13a is a memory that retains the peak level of the input waveform (a voltage waveform input from the vibration sensor 51a through the input section 15). After input of the input waveform from the vibration sensor 51a is started, each time the level of the input waveform sampled by the CPU 11 updates the maximum value in a predetermined peak hold period, the updated value is stored in the peak hold value memory 13a. It is assumed that the peak hold value memory 13a stores a value that is a peak level (the maximum value) of the input waveform at the time when the peak hold period ends.

The waveform buffer 13b is a buffer that stores the levels of the input waveform that the CPU 11 sampled in time series during the peak hold period. The levels of the input waveform accumulated in the waveform buffer 13b are used to determine the frequency of zero-crossings of the input waveform when the peak hold period ends.

The peak hold counter 13c is a counter that times the peak hold period for obtaining the peak value of the input waveform from the vibration sensor 51a. When the level of the input waveform exceeds a predetermined threshold L2 (see FIG. 3) after the input of the input waveform has begun, the timing measurement by the peak hold counter 13c starts. The threshold L2 is a threshold set for the level of the input waveform, and is a threshold used for judging as to whether the input waveform is one that is caused by noise. After the timing starts, when the peak hold period (2 msec in one example embodiment) specified in advance passes, the timing is stopped.

The peak hold-in flag 13d is a flag that indicates whether the peak hold period is being timed by the peak hold counter 13c. More specifically, when the peak hold-in flag 13d is set on, it indicates that the peak hold period is being timed. The peak hold-in flag 13d is set on when timing with the peak hold counter 13c begins, and is set off when the timing ends.

The tone generation-in flag 13e is a flag that indicates whether the sound source device 1 is generating a tone based on striking on the pad 51. More specifically, when the tone generation-in flag 13e is set on, it indicates that the tone is being generated. The tone generation-in flag 13e is set on, when it is determined that the input waveform input from the vibration sensor 51a is one that is caused by a strike on the pad 51, and generation of the tone from the sound source 16 starts. The tone generation-in flag 13e that has been set on is set off, after a predetermined time has passed or the level of the input waveform falls below a predetermined level.

The operation panel 14 is provided with operators and display devices, and is used as a user interface. The operators are used to set various parameters, including the volume, etc. The display devices display the values of parameters set by the operators.

The input section 15 is an interface that connects with the vibration sensor 51a installed in the pad 51. An analog signal waveform output from the vibration sensor 51a is input to the sound source device 1 through the input section 15. An analog-to-digital converter (not shown) is built into the input section 15. The analog signal waveform input from the vibration sensor 51a is converted into digital values with the analog-to-digital converter at each predetermined interval. The CPU 11 determines, based on the digital values converted at the input section 15, whether the pad 51 is struck. As described in more detail, below, when the peak level of the input waveform exceeds a threshold L1 (see FIG. 3) or the frequency of zero-crossings of the input waveform exceeds a predetermined frequency, the CPU 11 determines that the pad 51 has been struck, and outputs, to the sound source 16, a tone generation instruction to output a tone with a timbre corresponding to the pad 51, and with a volume corresponding to the peak level.

When the tone generation instruction is received from the CPU 11, the sound source 16 generates the tone with the timbre and the volume according to the tone generation instruction. A waveform ROM (not shown) is built into the sound source 16. Digital tones with the timbre corresponding to the pad 51 are stored in the waveform ROM. Moreover, a DSP (Digital Signal Processor) (not shown), that processes filters and effects, is built into the sound source 16. When the generation instruction is input from the CPU 11, the sound source 16 reads a digital tone with a timbre according to the generation instruction from the waveform ROM, performs predetermined processings such as filter and effect with the DSP, and outputs the processed digital tone to a digital-to-analog converter DAC 17. The DAC 17 converts the input digital tone into an analog tone, outputs the same to a speaker 41 installed outside of the sound source device 1. As a result, a tone based on the striking on the pad 51 is emanated from the speaker 41.

Figure 2:
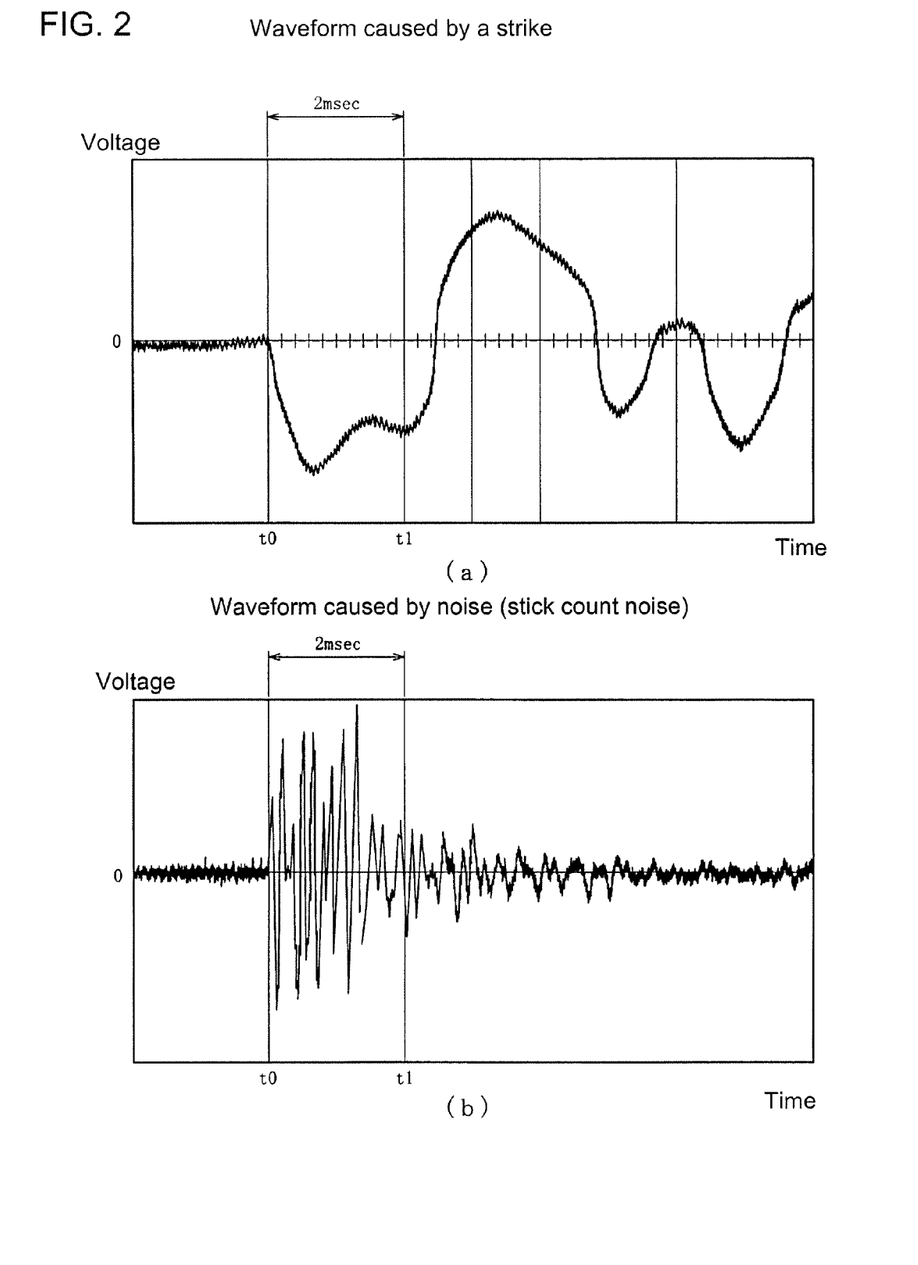
FIG. 2(a) is a voltage-time graph of a voltage waveform caused by a strike (output waveform from a vibration sensor).
FIG. 2(b) is a voltage-time graph of a voltage waveform caused by noise.

Characteristics of a voltage waveform output from the vibration sensor 51a are described with reference to FIG. 2. The graph of FIG. 2(a) represents a waveform caused by a strike on the pad 51. The graph of FIG. 2(b) represents a waveform based on stick count noise (noise generated upon striking two sticks together). In both of the waveform graphs shown in FIGS. 2(a) and 2(b), a vertical axis indicates voltage and a horizontal axis indicates time. However, the vertical axis in the graph of FIG. 2(a) has a scale that is about ten times greater than that of the graph of FIG. 2(b), though both of the graphs are in the same scale along the horizontal axis.

As shown in FIG. 2(a), in the period from time t0 at which the waveform output starts to time t1 after 2 msec, which corresponds to a peak hold period, the voltage waveform caused by a strike has no occurrence of which the voltage assumes a positive value or a negative value by passing through the zero point (that is, zero-crossing). On the other hand, as shown in FIG. 2(b), in the period (2 msec) from time t0 at which the waveform output starts to time t1, the voltage waveform caused by noise has many zero-crossings occurred.

It is clear from the waveform graphs shown in FIG. 2(a) and FIG. 2(b) that the voltage waveform caused by a strike and the voltage waveform caused by noise differ greatly in the frequency of zero-crossings in a predetermined period (for example, 2 msec here) after the output starts.

Figure 3:
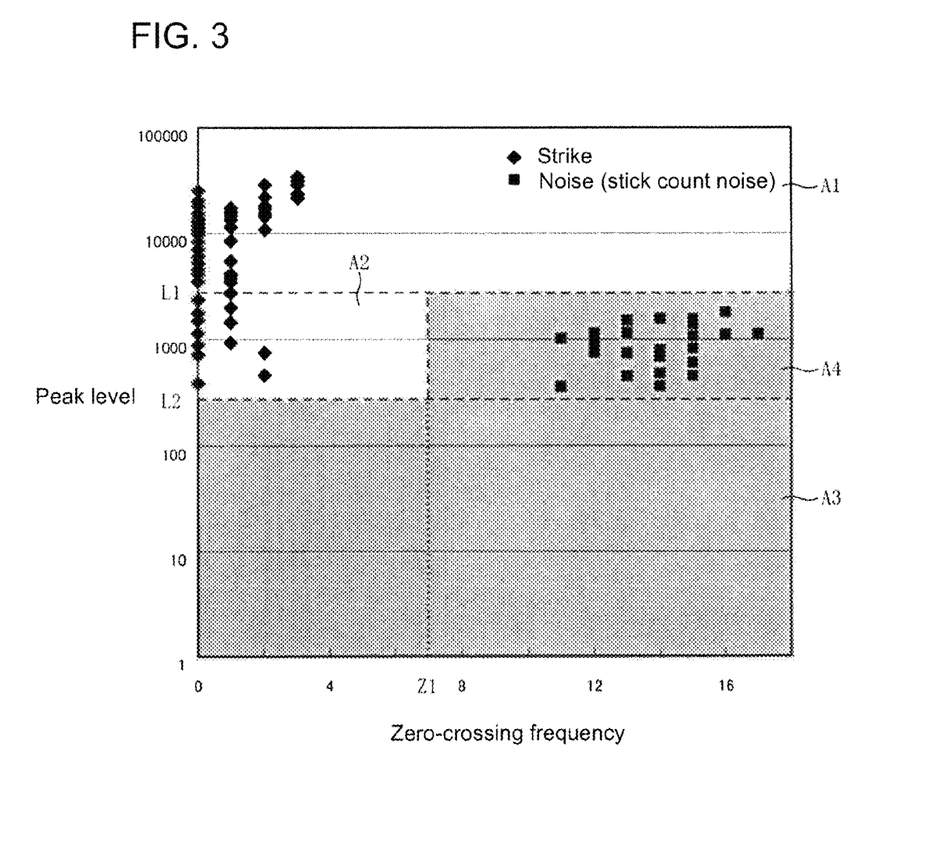
FIG. 3 is a graph showing a relation between peak levels of a voltage waveform output from a vibration sensor and the frequency of zero-crossings of the voltage waveform.

FIG. 3 is a graph representing a relation between peak levels of the voltage waveform output from the vibration sensor 51a (in other words, input waveform input from the input section 15) and the frequency of zero-crossings of the voltage waveform. Both the peak levels and the frequency of zero-crossings in FIG. 3 are those that occur in a predetermined period from the beginning of output of the voltage waveform (the beginning of input of the input waveform).

In the graph of FIG. 3, the vertical axis shows the peak level of the voltage waveform, and the horizontal axis shows the frequency of zero-crossings of the voltage waveform. A black diamond symbol (♦) in this graph represents the voltage waveform caused by a strike. On the other hand, a black square symbol (■) represents the voltage waveform caused by noise (stick count noise).

According to the graph of FIG. 3, the voltage waveform (♦) caused by a strike tends to have a relatively large peak level, and a lower frequency of zero-crossings. On the other hand, the voltage waveform (■) caused by noise tends to have a relatively small peak level, and a higher frequency of zero-crossings.

Conventionally, the tone generation was controlled such that, when the peak level of the input waveform exceeds a threshold, it is determined to be caused by a strike, and a tone is generated; and when the peak level of the input waveform is below the threshold, it is determined to be caused by noise, and a tone is not generated. However, according to the graph in FIG. 3, when the threshold to determine whether or not a peak level is caused by a strike is set at a threshold L1 that is greater than noise with high peak levels so as to not pick up noise, strike waveforms or portions of strike waveforms with peak levels below the threshold L1 cannot be detected. On the other hand, when the threshold to determine whether or not a peak level is caused by striking is set at a threshold L2 that is smaller than noise with small peak levels but is capable of detecting weak strikes, noise is erroneously determined to be a strike.

On the other hand, there is a difference in the frequency of zero-crossings between the voltage waveform (♦) caused by a strike and the voltage waveform (■) caused by noise. Therefore, according to an embodiment of the present invention, the sound source device 1 (the striking detection device 100) is provided with a threshold Z1 for the zero-crossing frequency in the peak level segment between the threshold L1 and the threshold L2. As a result, voltage waveforms (input waveforms) caused by a strike that are included in the peak level section between the threshold L1 and the threshold L2 can be separated from voltage waveforms (input waveforms) caused by noise. Accordingly, among the input waveforms with peak levels that are included in the peak level segment between the threshold L1 and the threshold L2, those with the frequency of zero-crossings below the threshold Z1 are identified as striking sounds, and the others with the frequency of zero-crossings exceeding the threshold Z1 can be identified as noise.

In other words, in the above-discussed embodiment, the sound source device 1 (the striking detection device 100) determines that an input waveform whose peak level exceeds the threshold L1 (that is, an input waveform included in an area A1) is an input waveform caused by a strike. Also, the sound source device 1 (the striking detection device 100) determines that an input waveform whose peak level is between the threshold L1 and the threshold L2, and the zero-crossing frequency is below the threshold Z1 (that is, an input waveform included in an area A2) is an input waveform caused by a strike. On the other hand, the sound source device 1 (the striking detection device 100) determines that an input waveform whose peak level is below the threshold L2 (that is, an input waveform included in an area A3) is an input waveform caused by noise. Also, the sound source device 1 (the striking detection device 100) determines that an input waveform whose peak level is between the threshold L1 and the threshold L2, and the zero-crossing frequency exceeds the threshold Z1 (that is, an input waveform included in area A4) is an input waveform caused by noise. In FIG. 3, the area including input waveforms that are determined to be caused by noise (areas A3 and A4) are shown as a colored area, so that they can be readily distinguished from the area including input waveforms that are determined to be caused by a strike (areas A1 and A2).

In the above described embodiment, the sound source device 1 (the striking detection device 100) identifies a strike or noise, based on the peak level of an input waveform (a voltage waveform output from the vibration sensor 51a) and the zero-crossing frequency of the input waveform. In this manner, a strike with a small peak level and noise can be clearly distinguished from one another. Therefore, weak striking can be reliably detected, and noise can be prevented from being erroneously determined to be a strike.

An example of processing executed by the CPU 11 of the sound source device 1 (the striking detection device 100) is described with reference to FIG. 4. The A/D interrupt processing in FIG. 4 is processing by the CPU 11 to periodically sample the level of an input waveform (a voltage waveform output from the vibration sensor 51a) that has been input in the input section 15 and converted into a digital value. In one example embodiment, the A/D interrupt processing is executed each 0.1 msec measured with a timer (not shown) built into the CPU 11. In other embodiments, other suitable sample periods may be employed.

First, the CPU 11 acquires from the input section 15, the level of the voltage waveform output from the vibration sensor 51a (S401). Next, if the CPU 11 determines that the tone generation-in flag 13e is on (S402: Yes), the tone is being generated and, in this case, the CPU 11 ends this processing.

On the other hand, when the CPU 11 determines that the tone generation-in flag 13e is off, and the peak hold-in flag 13d is off (S402: No, S403: No), no tone is generated, and the peak hold period is not being timed. Therefore, the CPU 11 determines, in this case, whether the absolute value of the acquired level exceeds the threshold L2 (a threshold of levels for determining whether or not the input waveform is one that is caused by noise) (S415).

In S415, when the CPU 11 determines that the absolute value of the acquired level is below the threshold L2 (S415: No), the CPU 11 ends this processing. On the other hand, in S415, when the CPU 11 determines that the absolute value of the acquired level exceeds the threshold L2 (S415: Yes), the CPU 11 overwrites and stores the absolute value of the acquired level as a peak level in the peak hold value memory 13a (S416).

Next, the CPU 11 starts timing with the peak hold counter 13c, to begin the timing of the peak hold period (S417), and sets the peak hold-in flag 13d on (S418). The peak hold counter 13c that started timing is periodically updated in an unshown count processing executed by the CPU 11.

Next, the CPU 11 clears the waveform buffer 13b (S419), stores the acquired level in the waveform buffer 13b (S420), and ends this processing.

On the other hand, when the CPU 11 determines that the tone generation-in flag 13e is off, and the peak hold-in flag 13d is on (S402: No, S403: Yes), the peak hold period is being timed. Therefore, the CPU 11 determines, in this case, whether the level acquired in S401 exceeds the peak level stored in the peak hold value memory 13a (S404).

In S404, when the acquired level exceeds the peak level (S404: Yes), the CPU 11 updates the peak level stored in the peak hold value memory 13a with the acquired level (S405), and shifts the processing to S406. On the other hand, in S404, when the absolute value of the acquired level is below the peak level (S404: No), the CPU 11 shifts the processing to S406, directly. In S406, the CPU 11 adds and stores the acquired level to the waveform buffer 13b (S406).

Next, the CPU 11 determines whether or not the value of the peak hold counter 13c exceeded the peak hold period (which, in one example embodiment, is 2 msec) (S407). In S407, when the CPU 11 determines that the value of the peak hold counter 13c has not exceeded the peak hold period yet (S407: No), the CPU11 ends this processing.

On the other hand, in S407, when the CPU11 determines that the value of the peak hold counter 13c exceeded the peak hold period (S407: Yes), the CPU 11 stops the peak hold counter 13c (S408), and sets the peak hold-in flag 13d off (S409). After stopping the peak hold counter 13c in S408, the CPU 11 clears the peak hold counter 13c to zero.

Next, the CPU 11 determines whether or not the peak level stored in the peak hold value memory 13a exceeds the threshold L1 (a threshold of levels for determining whether or not the input waveform is one that is cause by a strike) (S410). In S410, when the CPU 11 determines that the peak level exceeds the threshold L1 (S410: Yes), the CPU 11 determines that the input waveform is caused by a strike, and executes a tone generation processing (S413). Accordingly, in S413, the CPU 11 outputs, to the sound source 16a, a tone generation instruction to generate the tone of the pad 51 with a volume corresponding to the peak level. After executing the tone generation processing (S413), the CPU 11 sets a tone generation flag 13e on (S414) and ends this processing.

On the other hand, in S410, when the CPU 11 determines that the peak level is below the threshold L1 (S410: No), the CPU 11 counts the number of zero-crossings of the waveform stored in the waveform buffer 13b (S411). Next, the CPU 11 determines whether or not the number of zero-crossings counted exceeds the threshold Z1 (S412).

In S412, when the CPU 11 determines that the number of zero-crossings counted exceeds the threshold Z1 (S412: Yes), the CPU 11 determines that the input waveform is one that is caused by noise, and ends this processing. On the other hand, in S412, when the CPU 11 determines that the number of zero-crossings counted is below the threshold Z1 (S412: No), the CPU 11 determines that the input waveform is one that is caused by a strike, and executes the tone generation processing (S413).

According to the above-described embodiment of a sound source device 1 (the striking detection device 100), not only is the peak level of an input waveform considered, but also, the value indicative of the degree of change of the input waveform is considered, to determine whether or not the input waveform is one that is caused by a strike on the striking surface. Therefore, a waveform with small peak level caused by a weak strike can be prevented from being erroneously detected as noise. In other words, the accuracy in detecting a strike on the striking surface (the pad 51) is improved.

As the value indicative of the degree of change in an input waveform (the zero-crossing frequency), which expresses the number of vibrations of the input waveform, is used, the values can be easily acquired from the input waveform for the predetermined period (where 2 msec is the peak hold period in an example embodiment). Moreover, because the determination of whether or not an input waveform is caused by a strike is made based on the zero-crossing frequency acquired from the input waveform in the peak hold period, the accuracy in detecting a strike on the striking surface can be improved without accompanying an extra delay other than the peak hold. Moreover, because the filter needs not be passed, in this respect, the accuracy in detecting a strike on the striking surface can be improved without accompanying an extra delay.

High frequency can be introduced in a voltage waveform that is output from the vibration sensor 51a when the pad 51 is struck, such that there is a possibility that the zero-crossing frequency of the waveform may increase. However, according to embodiments of the present invention, the sound source device 1 (the striking detection device 100) determines that the input waveform whose peak level exceeds the threshold L1 is a waveform caused by a strike on the pad 51, regardless of the zero-crossing frequency, such that striking on the striking surface of the pad 51 can be readily and reliably detected.

Moreover, because an input waveform whose peak level is below the threshold L2 is determined to not be a waveform that is caused by a strike on the pad 51, regardless of the zero-crossing frequency, noise can be readily detected.

The invention has been described above based on example embodiments. However, the invention need not be limited in any particular manner to the embodiments described above, and various improvements and changes can be made without departing from the subject matter of the invention.

For example, stick count noise is referenced as a noise in the above-described embodiment. In particular, in the above-described example embodiment, the sound source device 1 (the striking detection device 100) is able to remove stick count noise. However, further embodiments of the invention are configured to remove other types of noise or sound from outside, other than stick count noise. Therefore, accurate detection of strikes on the striking surface can be provided with embodiments of the present invention.

For example, embodiments of the invention may be applied when the pad 51 and an acoustic drum are used and mixed together. In this case, the sound source device 1 (the striking detection device 100) removes the striking sound of the acoustic drum that is picked up by the vibration sensor 51a of the pad 51, based on the peak level of the input waveform and the value indicative of the degree of change in the waveform (for example, the zero-crossing frequency). Or, when the vibration sensor 51a picks up sounds of other musical instruments emanated from a monitor speaker, the sound source device 1 (the striking detection device 100) may remove the sounds, based on the peak level of the input waveform and the value indicative of the degree of change in the waveform (for example, the zero-crossing frequency).

Moreover, as shown in FIG. 3, in the above-described embodiment, whether an input waveform is caused by a strike or caused by noise is determined based on the threshold L1 and L2 for peak levels, and the threshold Z1 for the zero-crossing frequency. Instead of such a configuration, the determination of whether or not an input waveform is one that is caused by a strike may be made based on the threshold L1 for peak level and the threshold Z1 for zero-crossing frequency, without using the threshold L2 for peak level.

In this case, the sound source device 1 (the striking detection device 100) determines that input waveforms whose peak level exceeds the threshold L1, and input waveforms whose peak level is below the threshold L1 and zero-crossing frequency is below the thresholds Z1 are input waveforms caused by strikes. On the other hand, the sound source device 1 (the striking detection device 100) determines that input waveforms whose peak level is below the threshold L1 and zero-crossing frequency exceeds the threshold Z1 are input waveforms caused by noise.

Alternatively, whether input waveforms are caused by a strike may be determined based on the threshold Z1 of the frequency of zero-crossings, without using either the threshold L1 or L2 for peak levels. In this case, the sound source device 1 (the striking detection device 100) determines that input waveforms whose zero-crossing frequency is below the threshold Z1 are input waveforms caused by strikes. On the other hand, the sound source device 1 (the striking detection device 100) determines that input waveforms whose zero-crossing frequency exceeds the threshold Z1 are input waveforms caused by noise.

Figure 5:
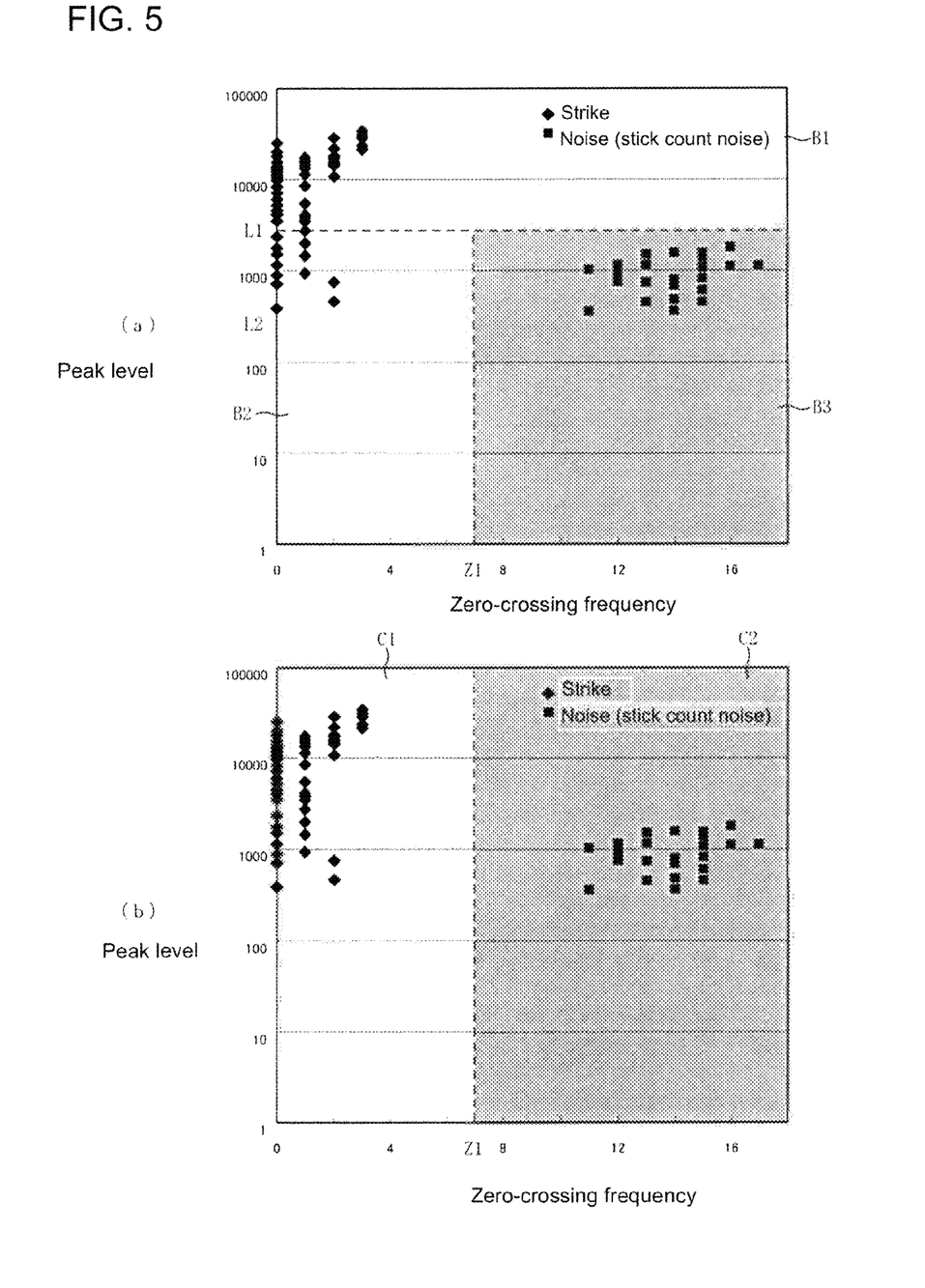
FIG. 5(a) is a graph for explaining a further example of a judging method.
FIG. 5(b) is a graph for explaining another example of a judging method.

Graphs shown in FIGS. 5(a) and 5(b) are generally the same as the graph shown in FIG. 3, except that the areas divided by thresholds (areas B1-B3, and area C1 and C2) are different.

The graph of FIG. 5(a) shows the case in which the determination of whether or not input waveforms are caused by strikes is based on the threshold L1 for peak levels and the threshold Z1 for zero-crossing frequency. In this manner, input waveforms included in an area B1 (where the peak level exceeds the threshold L1) and waveforms included in an area B2 (where the peak level is below the threshold L1 and the zero-crossing frequency is below the thresholds Z1) are determined to be input waveforms caused by strikes. On the other hand, waveforms included in a colored area B3 (where the peak level is below the threshold L1 and the zero-crossing frequency exceeds the thresholds Z1) are determined to be input waveforms caused by noise.

The graph of FIG. 5(b) shows the case in which the determination of whether or not input waveforms are caused by strikes is based on the threshold Z1 for zero-crossing frequency. In this case, input waveforms included in an area C1 (where the zero-crossing frequency is below the threshold Z1) are determined to be input waveforms caused by strikes. On the other hand, input waveforms included in the colored area C2 (where the zero-crossing frequency exceeds the threshold Z1) are determined to be input waveforms caused by noise.

However, high frequency can be introduced in voltage waveforms output from the vibration sensor 51a from striking on the pad 51, and the zero-crossing frequency of the waveforms may increase. Therefore, it may be desirable to employ at least the threshold L1 (a threshold that is greater than noise with high peak levels, and that does not pick up noise) as shown in FIG. 3 and FIG. 5(a).

Also, in the embodiment described above, input waveforms whose peak level exceeds the threshold L1, and input waveforms whose peak level is between the threshold L1 and the threshold L2 and zero-crossing frequency is below the threshold Z1 are determined to be input waveforms caused by strikes. On the other hand, input waveforms whose peak level is below the threshold L2, and input waveforms whose peak level is between the threshold L1 and the threshold L2 and zero-crossing frequency exceeds the threshold Z1 are determined to be input waveforms caused by noise. In other words, the determination of whether or not an input waveform is caused by a strike is based on whether the peak level and the zero-crossing frequency of the input waveform satisfy a predetermined relation.

In further embodiments, the "predetermined relation" is not limited to the relation exemplified in the above-described embodiment. For example, input waveforms included in an area above a line expressed by a predetermined function where y is assumed to be a peak level, and x is assumed to be a zero-crossing frequency, may be determined to be input waveforms caused by strikes. Similarly, input waveforms included in an area below the line may be determined to be input waveforms caused by noise.

The following functions may be exemplified as the "predetermined function" described above.

Straight line: $y=a(x-b)$

Quadratic curve: $x=ay^2+b$

S character curve: $y=a(\arctan(x-b))+c$

Combination of a circular (oval) arc and a straight line: $(x-a)^2+y^2=a^2$ in case of x<a; and x=a in case of x a where, in each of the expressions, y≥0, a≥0, b≥0, and c≥0.

Also, in the embodiment described above, whether or not an input waveform is caused by a strike is determined according to whether or not the peak level and the zero-crossing frequency of the input waveform during a predetermined period (for example, 2 msec) satisfy a predetermined relation. However, other values that indicate the degree of change in a waveform can be employed, instead of the zero-crossing frequency.

For example, a value obtained by adding up absolute values of differences measured at each sampling of a waveform in a predetermined period may be divided by the peak value of the absolute values in the added-up segments in the predetermined period to obtain a value. This value may be used as the other value, instead of the zero-crossing frequency, that indicates the degree of change in a waveform. Such a value also indicates the number of vibrations of an input waveform, similar to the zero-crossing frequency. Instead of the "peak value of the absolute values," a "positive peak value," a "negative peak value," or a "difference between a positive peak value and a negative peak value" may be used. Though processing to obtain such a value becomes complex, compared with the zero-crossing frequency, there is the advantage in that the value is not affected in a situation where zero-crossings do not occur when DC components (noise) are introduced into the waveform.

As another example, the frequency of inversions of increase and decrease in the level of a waveform in a predetermined period, given with a hysteresis, may be counted, and the frequency of inversions may be used as a value that indicates the degree of change in a waveform, instead of the zero-crossing frequency. Such a value also indicates the number of vibrations of an input waveform, similar to the zero-crossing frequency. Accordingly, a threshold is employed, that is larger than noise typically introduced in an analog-to-digital converter in the input section 15. While updating the value when the difference from the last value exceeds the threshold, a detection is made as to whether the current value increased or decreased from the last value. In this instance, if the increase and the decrease reverses from the last value, an inversion is counted. Though processing to obtain such a value also becomes complex, compared with the zero-crossing frequency, there is the advantage in that the value is not affected in a situation where zero-crossings do not occur when DC components (noise) are introduced into the waveform.

Moreover, in the above-described embodiment, the number of zero-crossings is counted after the peak hold period is ended. However, in other embodiments, the number of zero-crossings is counted at any time during the peak hold period.

Moreover, in the embodiment described above, when it is determined (based on the zero-crossing frequency) that an input waveform is caused by noise, the input waveform is simply not generated (in other words, the noise is removed). However, in further embodiments, an area may be limited with the zero-crossing frequency and the peak levels in FIG. 3, thereby distinguishing stick count noise from other noises, to positively detect the stick count noise, and use the stick count noise for a tap tempo, etc.

Moreover, the numerical values enumerated in the above-described embodiment are provided as examples. In other embodiments, other numerical values can be used. For example, in the embodiment described above, 2 msec is exemplified as a peak hold period. However, the peak hold period can be selected, based on the combination of the kind of the striking surface (for instance, the size and the material) and the characteristic of the striking sensors.

Also, in the embodiment described above, two threshold values for peak levels (L1, L2) and one threshold value for zero-crossing frequency are exemplified as the threshold values. However, other suitable numbers of thresholds can be set for both of the peak levels and the zero-crossing frequency. Further, the area designated to correspond to input waveforms caused by strikes and the area designated to correspond to input waveforms caused by noise can be set to any suitable areas divided according to a threshold along the vertical axis (peak levels) and a threshold along the horizontal axis (zero-crossing frequencies).

Moreover, in the above-described embodiment, the striking detection device 100 is configured for detecting strikes on the one pad 51. However, further embodiments of the striking detection device 100 may be configured to individually detect strikes to each of plural pads. In this case, the A/D interrupt processing of FIG. 4 may be executed for each of the pads to be processed. Also, in the embodiment described above, the striking detection device 100 is configured to be built into the sound source device 1. However, the striking detection device 100 may be provided independently from the sound source device 1. Moreover, the striking detection device 100 may be built into an electronic percussion instrument that has a pad (such as the pad 51).

In the embodiment described above, S404, S405, and S416 are an example of a peak level acquisition device. Also, S406 and S411 are an example of a value acquisition device. Moreover, S410 and S412 are an example of a judging device.

The invention claimed is:

1. A striking detection device, comprising:
a peak level acquisition device that acquires a peak level of a waveform in a predetermined period after starting input of the waveform;
a value acquisition device that acquires a value indicative of the degree of change in the waveform in the predetermined period, the value indicative of the degree of change in the waveform comprising a value indicative of the number of vibrations of the waveform; and
a judging device that determines, based on the peak level acquired by the peak level acquisition device and the value obtained by the value acquisition device, whether the waveform is caused by a strike on a striking surface.

2. A striking detection device according to claim 1, wherein the judging device determines that the waveform is caused by a strike on the striking surface when the peak level and the value indicative of the degree of change in the waveform satisfy a predetermined relation.

3. A striking detection device according to claim 2, wherein, when the value indicative of the degree of change in the waveform indicates that the waveform is vibrating with a frequency below a predetermined threshold, the judging device determines that the waveform is caused by a strike on the striking surface, and when the value indicative of the degree of change in the waveform indicates that the waveform is vibrating with a frequency exceeding the predetermined threshold, the judging device determines that the waveform is not caused by a strike on the striking surface.

4. A striking detection device according to claim 3, wherein, when the peak level exceeds a first level, the judging device determines that the waveform is caused by a strike on the striking surface, irrespective of the value indicative of the degree of change in the waveform.

5. A striking detection device according to claim 4, wherein, when the peak level is below a second level lower than the first level, the judging device determines that the waveform is not caused by a strike on the striking surface, irrespective of the value indicative of the degree of change in the waveform.

6. A striking detection device according to claim 5, wherein the value acquisition device acquires the frequency of zero-crossings of the waveform within the predetermined period, as the value indicative of the degree of change in the waveform.

7. A striking detection device according to claim 5, wherein the value acquisition device acquires a first value divided by a second value, within the predetermined period, as the value indicative of the degree of change in the waveform, where the first value is obtained by adding up absolute values of differences measured at each sampling of the waveform, and wherein the second value is based on the peak value in the level in the added-up segments.

8. A striking detection device according to claim 5, wherein the value acquisition device acquires the frequency of inversions of increase and decrease in the level of the waveform with a hysteresis, as the value indicative of the degree of change in the waveform.

9. A striking detection device according to claim 1, wherein, when the value indicative of the degree of change in the waveform indicates that the waveform is vibrating with a frequency below a predetermined threshold, the judging device determines that the waveform is caused by a strike on the striking surface, and when the value indicative of the degree of change in the waveform indicates that the waveform is vibrating with a frequency exceeding the predetermined threshold, the judging device determines that the waveform is not caused by a strike on the striking surface.

10. A striking detection device according to claim 1, wherein, when the peak level exceeds a first level, the judging device determines that the waveform is caused by a strike on the striking surface, irrespective of the value indicative of the degree of change in the waveform.

11. A striking detection device according to claim 1, wherein, when the peak level is below a second level lower than the first level, the judging device determines that the waveform is not caused by a strike on the striking surface, irrespective of the value indicative of the degree of change in the waveform.

12. A striking detection device according to claim 1, wherein the value acquisition device acquires a first value divided by a second value, within the predetermined period, as the value indicative of the degree of change in the waveform, where the first value is obtained by adding up absolute values of differences measured at each sampling of the waveform, and wherein the second value is based on the peak value in the level in the added-up segments.

13. A striking detection device according to claim 1, wherein the value acquisition device acquires the frequency of inversions of increase and decrease in the level of the waveform with a hysteresis given, as the value indicative of the degree of change in the waveform.

14. The striking detection device according to claim 1, wherein the value indicative of the number of vibrations of the waveform is determined by a frequency of the waveform during the predetermined period.

15. The striking detection device according to claim 1, wherein the value indicative of the number of vibrations of the waveform is determined by a number of instances the waveform crosses a predetermined voltage value during the predetermined period.

16. A striking detection device, comprising:
a peak level acquisition device that acquires a peak level of a waveform in a predetermined period after starting input of the waveform;
a value acquisition device that acquires a value indicative of the degree of change in the waveform in the predetermined period; and
a judging device that determines, based on the peak level acquired by the peak level acquisition device and the value obtained by the value acquisition device, whether the waveform is caused by a strike on a striking surface, wherein the value acquisition device acquires the frequency of zero-crossings of the waveform within the predetermined period, as the value indicative of the degree of change in the waveform.

17. A striking detection method, comprising:
acquiring a peak level of a waveform in a predetermined period after starting input of the waveform;
acquiring a value indicative of the degree of change in the waveform in the predetermined period, the value indicative of the degree of change in the waveform comprising a value indicative of the number of vibrations of the waveform; and
determining with a processor whether the waveform is caused by a strike on a striking surface, based on the peak level and the value indicative of the degree of change in the waveform.

18. A method according to claim 17, wherein determining whether the waveform is caused by a strike on a striking surface includes determining that the waveform is caused by a strike on the striking surface when the peak level and the value indicative of the degree of change in the waveform satisfy a predetermined relation.

19. A method according to claim 17, wherein, determining whether the waveform is caused by a strike on a striking surface includes determining that the waveform is caused by a strike on the striking surface when the value indicative of the degree of change in the waveform indicates that the waveform is vibrating with a frequency below a predetermined threshold, and determining that the waveform is not caused by a strike on the striking surface when the value indicative of the degree of change in the waveform indicates that the waveform is vibrating with a frequency exceeding the predetermined threshold.

20. A method according to claim 17, wherein, determining whether the waveform is caused by a strike on a striking surface includes determining that the waveform is caused by a strike on the striking surface when the peak level exceeds a first level, irrespective of the value indicative of the degree of change in the waveform.

21. A method according to claim 17, wherein, determining whether the waveform is caused by a strike on a striking surface includes determining that the waveform is not caused by a strike on the striking surface when the peak level is below a second level lower than the first level, irrespective of the value indicative of the deuce of change in the waveform.

* * * * *